(12) United States Patent
Keller et al.

(10) Patent No.: US 7,569,625 B2
(45) Date of Patent: Aug. 4, 2009

(54) SELF-HEALING ELASTOMER SYSTEM

(75) Inventors: Michael W. Keller, Urbana, IL (US);
Nancy R. Sottos, Champaign, IL (US);
Scott R. White, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 240 days.

(21) Appl. No.: 11/421,993

(22) Filed: Jun. 2, 2006

(65) Prior Publication Data

US 2007/0282059 A1    Dec. 6, 2007

(51) Int. Cl.
*C08K 9/10* (2006.01)
(52) U.S. Cl. .................. 523/211; 523/200; 528/18; 428/402.21; 427/387
(58) Field of Classification Search .............. 523/200, 523/211; 528/18; 428/402.21; 427/387
See application file for complete search history.

(56) References Cited

U.S. PATENT DOCUMENTS

| | | | |
|---|---|---|---|
| 3,041,289 A | 6/1962 | Katchen et al. |
| 3,069,370 A | 12/1962 | Jensen et al. |
| 3,868,199 A | 2/1975 | Fera |
| 4,080,238 A | 3/1978 | Wolinski et al. |
| 4,301,306 A | 11/1981 | Layer |
| 4,324,717 A | 4/1982 | Layer |
| 4,380,617 A | 4/1983 | Minchak et al. |
| 4,389,496 A | 6/1983 | Leüsner et al. |
| 4,461,854 A | 7/1984 | Smith |
| 4,708,969 A | 11/1987 | Leach |
| 4,755,588 A | 7/1988 | Vallance et al. |
| 4,758,400 A | 7/1988 | Dunnavant et al. |
| 4,804,427 A | 2/1989 | Paul et al. |
| 4,853,434 A | 8/1989 | Block |
| 4,902,560 A | 2/1990 | Silver |
| 4,940,645 A | 7/1990 | Davis et al. |
| 4,943,621 A | 7/1990 | Janda et al. |
| 5,063,103 A | 11/1991 | Sugawara et al. |
| 5,185,108 A | 2/1993 | Shimandle |
| 5,312,940 A | 5/1994 | Grubbs et al. |
| 5,324,616 A | 6/1994 | Sacripante et al. |
| 5,342,909 A | 8/1994 | Grubbs et al. |
| 5,413,924 A | 5/1995 | Kosak et al. |
| 5,427,880 A | 6/1995 | Tamura et al. |
| 5,504,176 A | 4/1996 | Fujiki |
| 5,550,044 A | 8/1996 | Kosak et al. |
| 5,561,173 A | 10/1996 | Dry |
| 5,575,841 A | 11/1996 | Dry |
| 5,643,764 A | 7/1997 | Kosak et al. |
| 5,660,624 A | 8/1997 | Dry |
| 5,789,494 A | 8/1998 | Hand et al. |
| 5,801,033 A | 9/1998 | Hubbell et al. |
| 5,803,963 A | 9/1998 | Dry |
| 5,840,238 A | 11/1998 | Setiabudi et al. |
| 5,958,325 A | 9/1999 | Seemann, III et al. |
| 5,989,334 A | 11/1999 | Dry |
| 6,001,909 A | 12/1999 | Setiabudi |
| 6,040,363 A | 3/2000 | Warner et al. |
| 6,048,488 A | 4/2000 | Fink et al. |
| 6,075,072 A | 6/2000 | Guilbert et al. |
| 6,100,323 A | 8/2000 | Setiabudi et al. |
| 6,113,728 A | 9/2000 | Tsukagoshi et al. |
| 6,224,793 B1 | 5/2001 | Hoffman et al. |
| 6,235,856 B1 | 5/2001 | Hafner et al. |
| 6,258,870 B1 | 7/2001 | Hubbell et al. |
| 6,261,360 B1 | 7/2001 | Dry |
| 6,287,992 B1 | 9/2001 | Polansky et al. |
| 6,316,194 B1 | 11/2001 | Karn et al. |
| 6,388,865 B1 | 5/2002 | Honda et al. |
| 6,479,167 B2 | 11/2002 | Sumita et al. |
| 6,518,330 B2 | 2/2003 | White et al. |
| 6,527,849 B2 | 3/2003 | Dry |
| 6,599,633 B1 * | 7/2003 | Wolf et al. .................. 428/447 |
| 6,669,961 B2 | 12/2003 | Kim et al. |
| 6,808,461 B2 | 10/2004 | Harris et al. |
| 6,858,659 B2 | 2/2005 | White et al. |

(Continued)

FOREIGN PATENT DOCUMENTS

DE    1590958    5/1970

(Continued)

OTHER PUBLICATIONS

Karukstis, Kerry K., Hecke, Gerald R. Chemistry Connections: The chemical Basis of Everyday Phenomena; Academic Press; 2003, Second Edition, p. 88 (Dimethylsiloxane).*

(Continued)

*Primary Examiner*—Randy Gulakowski
*Assistant Examiner*—Olatunde S Ojurongbe
(74) *Attorney, Agent, or Firm*—Blanchard & Associates (57) ABSTRACT

A composite material includes an elastomer matrix, a set of first capsules containing a polymerizer, and a set of second capsules containing a corresponding activator for the polymerizer. The polymerizer may be a polymerizer for an elastomer. The composite material may be prepared by combining a first set of capsules containing a polymerizer, a second set of capsules containing a corresponding activator for the polymerizer, and a matrix precursor, and then solidifying the matrix precursor to form an elastomeric matrix.

15 Claims, 4 Drawing Sheets

U.S. PATENT DOCUMENTS

| | | | |
|---|---|---|---|
| 7,022,179 | B1 | 4/2006 | Dry |
| 7,045,562 | B2 | 5/2006 | Thiel |
| 7,192,993 | B1 | 3/2007 | Sarangapani et al. |
| 7,276,252 | B2 | 10/2007 | Payumo et al. |
| 2002/0007959 | A1 | 1/2002 | Kaltenborn et al. |
| 2002/0111434 | A1 | 8/2002 | White et al. |
| 2004/0007784 | A1 | 1/2004 | Skipor et al. |
| 2004/0055686 | A1 | 3/2004 | Cowger et al. |
| 2005/0038173 | A1* | 2/2005 | Harris et al. ............. 524/495 |
| 2005/0085564 | A1 | 4/2005 | Thiel |
| 2005/0250878 | A1* | 11/2005 | Moore et al. ............. 523/211 |
| 2006/0111469 | A1 | 5/2006 | White et al. |
| 2006/0252852 | A1 | 11/2006 | Braun et al. |
| 2006/0281834 | A1 | 12/2006 | Lee et al. |
| 2007/0166542 | A1 | 7/2007 | Braun et al. |
| 2007/0282059 | A1 | 12/2007 | Keller et al. |

FOREIGN PATENT DOCUMENTS

| | | |
|---|---|---|
| DE | 42 09 031 | 9/1993 |
| DE | 10157123 | 1/2003 |
| EP | 0020123 | 12/1980 |
| EP | 0287288 | 10/1988 |
| EP | 0 349 855 | 1/1990 |
| EP | 0 424 833 | 5/1991 |
| EP | 0 669 368 | 8/1995 |
| EP | 0985737 | 3/2000 |
| EP | 1168372 | 1/2002 |
| WO | WO 90/00005 | 1/1990 |
| WO | WO 93/20111 | 10/1993 |
| WO | WO 96/16100 | 5/1996 |
| WO | WO 96/20235 | 7/1996 |
| WO | WO 97/25360 | 7/1997 |
| WO | WO 99/47704 | 9/1999 |
| WO | WO 99/55753 | 11/1999 |
| WO | WO 99/55794 | 11/1999 |
| WO | WO 02/064653 | 8/2002 |
| WO | WO 2004/035644 | 4/2004 |
| WO | WO 2005/118703 | 12/2005 |
| WO | WO 2007/009280 | 1/2007 |
| WO | WO 2007/082153 | 7/2007 |
| WO | WO 2007/143475 | 12/2007 |

OTHER PUBLICATIONS

Whelan A., Polmer Technology Dictionary, Feb. 1994, Springer, 1 edition, p. 396. "Silicone Rubber".*

Ratner B.D., Biomaterials Science, Second Edition: An introduction to Materials in Medicine, Aug. 2004, Academic Press, 2 edition, pp. 83-84. "Biomaterial Science".*

Cook, D.C., "Spectroscopic identification of protective and non-protective corrosion coatings on steel structures in marine environments", Corrosion Science, vol. 47, pp. 2550-2570, (2005).

Wessling, B., "Scientific engineering of anti-corrosion coating systems based on organic metals (polyaniline)", Journal of Corrosion Science and Engineering, vol. 1, paper 15, 19 pages, found at www.jcse.org, ISSN 1466-8858, (1999).

Cho, S.H., et al., "Polydimethylsiloxane-based self-healing materials", Advanced Materials, vol. 18, issue 8, pp. 997-1000, (2006).

Rzeszutko, A.A. et al., "Tensile properties of self-healing epoxy", TAM Techinical Reports—1041: Proceedings of the Fifth Undergraduate Research Conference in Mechanics, pp. 27-33, (2004).

Sudduth, R.D., "Analysis of the maximum tensile strength of a composite with spherical particulates", Journal of Composite Materials, vol. 40, No. 4, pp. 301-331, (2006); published on-line (2005).

Tvergaard, V., "Effect of ductile particle debonding during crack bridging in ceramics", International Journal of Mechanical Sciences, vol. 34, No. 8, pp. 635-649, (1992).

Zhang, X.X. et al., "Fabrication and properties of microcapsules and nanocapsules containing n-octadecane", Materials Chemistry and Physics, vol. 88, pp. 300-307, (2004).

Asua, J.M., "Miniemulsion Polymerization", Prog. Polymer Science, vol. 27, pp. 1283-1346, (2002).

Schork, F.J., "Miniemulsion Polymerization", Adv. Polym. Sci., vol. 175, pp. 129-255, (2005).

Blaiszik, B.J. et al., "Nanocapsules for self-healing composites", Proceedings of the SEM annual meeting on experimental and applied mechanics, Society for Experimental Mechanics, St. Louis, MO, 6 pages, Jun. 4-7, 2006.

Alexandridou, S. et al., "Surface characterization of oil-containing polyterephthalamide microcapsules prepared by interfacial polymerization", J. Microencapsulation, vol. 18, No. 6, pp. 767-781, (2001).

IUPAC, "emulsion", IUPAC Compendium of Chemical Terminology: IUPAC Recommendations, 2nd Edition, compiled by A.D. McNaught and A. Wilkinson, Blackwell, Oxford, 1 page, (1997).

Lansalot, M. et al., "RAFT miniemulsion polymerization: Influence of the structure of the RAFT agent", Macromolecules, vol. 35, No. 20, pp. 7582-7591, (2002).

Ni, P. et al., "Effect of operating variables and monomers on the formation of polyurea microcapsules", Journal of Membrane Science, vol. 103, pp. 51-55, (1995).

Ramirez, L.P. et al.,"Magnetic polystyrene nanoparticles with a high magnetite content obtained by miniemulsion processes", Macromolecular Chemistry and Physics, vol. 204, No. 1, pp. 22-31, (2003).

Tiarks, F. et al., "Preparation of polymeric nanocapsules by miniemulsion polymerization", Langmuir, vol. 17, No. 3, pp. 908-918, (2001).

Stevens, M.P., Polymer Chemistry, p. 184-186, 1999.

Stevens, M.P. Polymer Chemistry, p. 378-381, 1999.

Dry, C., et al., "Three part methylmethacrylate adhesive system as an internal delivery system for smart responsive concrete", Smart Mater. Struct., 5, p. 297-300, 1996.

Dry, C. "Matrix cracking repair and filling using active and passive modes for smart time release of chemicals from fibers into cement matrices", Smart Mater. Struct., 3, p. 118-123, 1994.

Dry, C., "Procedures developed for self-repair of polymer matrix composite materials", Composite Structures, 35, p. 263-269, 1996.

Dry, C. et al., "Passive smart self-repair in polymer matrix composite materials", SPIE, vol. 1916, p. 438-444, 1993.

D. Jung, et al., "Self-healing composites using embedded microspheres", K. Jacob, N. Katsube and W. Jones, ed., vol. MD-80, in Proceedings of the ASME International Mechanical Engineering Conference and Exposition, 265-275 (1997).

Beckwith, et al., "Resin Transfer Molding: A Decade of Technology Advances", SAMPE Journal, vol. 34, No. 6, p. 7-19, 1998.

Grubbs, R.H., et al., "Recent Advances in Olefin Metathesis and Its Application in Organic Synthesis", Tetrahedron 54, p. 4413-4450, 1998.

Dias, E.L., et al., "Well-Defined Ruthenium Olefin Metathesis Catalyst: Mechanism and Activity", J. Am. Chem. Soc., 119, p. 3887-3897, 1997.

Breslow, D.S., "Metathesis Polymerization", Prog. Polym. Sci. vol. 18, p. 1141-1195, 1993.

Dias, E.L., et al., "Synthesis and Investigation of Homo- and Heterobimetallic Ruthenium Olefin Metathesis Catalysts Exhibiting Increased Activities", Organometallics, 17, p. 2758-2767, 1998.

Weck, M., et al., "Synthesis of Discotic Columnar Side-Chain Liquid Crystalline Polymers by Ring-Opening Metathesis Polymerization (ROMP)", Macromolecules, 30, p. 6430-6437, 1997.

Fraser, C., et al., "Synthesis of Glycopolymers of Controlled Molecular Weight by Ring-Opening Metathesis Polymerization Using Well-Defined Functional Group Tolerant Ruthenium Carbene Catalysts", Macromolecules, 28, p. 7248-7255, 1995.

Bazan, G.C., et al., "Polymerization of Functionalized Norbornenes Employing Mo (CH-t-Bu) (NAr) (O-t-Bu)$_2$ as the Initiator", Marcomolecules, 24, p. 4495-4502, 1991.

Li, Victor C., et al., "Feasibility Study of a Passive Smart Self-healing cementitious composite.", Composites Part B, 29B, p. 819-827, 1998.

International Search Report dated Oct. 4, 2002 for Application No. PCT/US02/04163.

White, S.R., "Autonomic healing of polymer composites", Nature, 409: 794-797, 2001.

Dean, K., "Near-Infrared and Rheological Investigations of Epoxy-Vinyl Ester Interpenetrating Polymer Networks", Macromolecules, 34: 6623-6630, 2001.

Wool, Richard P., "A material fix", Nature, vol. 409, p. 773-774, 2001.

EPON, Resin 160 Epoxy Novolac Resin, Product Bulletin, p. 1-3, 2001.

Brown, E.N., et al., "Microcapsule Induced Toughening In a Self-Healing Polymer Composite", J. Mater. Sci.,39:1703-1710, 2004.

Brown, E.N., et al., "In Situ Poly(Urea-Formaldehyde) Microencapsulation of Dicyclopentadiene", J. Microencapsulation, 20: 719-730, 2003.

Brown, E.N., et al., "Fracture Testing of a Self-Healing Polymer Composite", Exp. Mech., 42: 372-379, 2002.

Kessler, M.R., et al., "Cure Kinetics of the Ring-Opening Metathesis Polymerization of Dicyclopentadiene", J. Polym. Sci. A: Polym. Chem., 40: 2373-2383, 2002.

Kessler, M.R., et al., "Self-Healing Structural Composite Materials", Composites: Part A, 34: 743-753, 2003.

Mostovoy, S., et al., "Use of Crack-Line-Loaded Specimens for Measuring Plane-Strain Fracture Toughness", J. Mater. , 2: 661-681, 1967.

Rule, J.D., et al., "ROMP Reactivity of Endo- and Exo-Dicyclopentadiene", Macromolecules, 35: 7878-7882, 2002.

Schwab, P., et al., "Synthesis and Applications of $RuCl_2(=CHR')(PR_3)_2$: The Influence of the Alkylidene Moiety on Metathesis Activity", J. Am. Chem, Soc., 118: 100-110, 1996.

Taber, D.F., et al., "Grubbs' Catalyst in Paraffin: An Air-Stable Preparation for Alkene Metathesis", J. Org. Chem., 68 6047-6048, 2003.

Wool, R.P., et al., "A Theory of Crack Healing in Polymers", J. Appl. Phys., 52: 5953-5963, 1981.

International Search Report dated Nov. 9, 2005 for PCT application No. PCT/US2005/015783.

Holden, G. "Elastomers, Thermoplastic" Encyclopedia of Polymer Science and Technology, John Wiley & Sons, 1-25, 2002.

Cho, S.H., "Polydimethylsiloxane-Based Self-Healing Materials", Advanced Materials, vol. 18, Issue 8, 997-100, Apr. 7, 2006.

International Search Report dated Aug. 1, 2006 for PCT application No. PCT/US2006/015703.

International Search Report and Written Opinion dated Oct. 24, 2007 for PCT application No. PCT/US2007/069981.

International Search Report and Written Opinion dated Feb. 22, 2008 for PCT application No. PCT/US2007/060149.

Keller, M.W. et al., "An elastomeric self-healing material", Proceedings of the 2006 SEM Annual Conference and Exposition on Experimental and Applied Mechanics 2006, vol. 1, pp. 379-382, (2006).

Pickering, S.U., "Emulsions", Journal of the Chemical Society, Transactions, vol. 91, pp. 2001-2021, (1907).

Finkle, P. et al., "The theory of emulsification", Journal of the American Chemical Society, vol. 45, No. 12, pp. 2780-2788, (1923).

Pieranski, P. "Two-dimensional interfacial colloidal crystals", Physical Review Letters, vol. 45, No. 7, pp. 569-572, (1980).

Gotro, J. et al., "Thermosets", Encyclopedia of Polymer Science and Technology, vol. 12, pp. 207-260, John Wiley & Sons, (2004).

Blaiszik, B.J. et al., "Nanocapsules for self-healing materials", Composites Science and Technology, vol. 68, pp. 978-986, (2008).

Gschwander, S. et al., "Micro-encapsulated paraffin in phase-change slurries", Solar Energy Materials & Solar Cells, vol. 89, pp. 307-315, (2005).

Rao, Y. et al.,"Preparation and thermal properties of microencapsulated phase change material for enhancing fluid flow heat transfer", Heat Transfer—Asian Research, vol. 36, No. 1, pp. 28-37, (2007), originally published in 2005.

Wei, L. et al., "Preparation and characterization of microencapsulated phase change material with low remnant formaldehyde content", Materials Chemistry and Physics, vol. 106, pp. 437-442, (2007).

Cayre, O.J. et al., "Fabrication of novel colloidosome microcapsules with gelled aqueous cores", Journal of Materials Chemistry, vol. 14, pp. 3351-3355, (2004).

Dinsmore, A.D. et al., "Colloidosomes: Selectively permeable capsules composed of colloidal particles", Science, vol. 298, pp. 1006-1009, (2002).

Croll, L.M. et al., "Composite tectocapsules via the self-assembly of functionalized poly(divinylbenzene) microspheres", Pure Appl. Chemistry, vol. 76, No. 7-8, pp. 1365-1374, (2004).

Utada, A.S. et al., "Monodisperse double emulsions generated from a microcapillary device", Science, vol. 308, pp. 537-541, (2005).

Shin, Y. et al., "Development of thermoregulating textile materials with microencapsulated phase change materials (PCM). II. Preparation and application of PCM Microcapsules", Journal of Applied Polymer Science, vol. 96, pp. 2005-2010, (2005).

Arshady, R., "Preparation of microspheres and microcapsules by interfacial polycondensation techniques", Journal of Microencapsulation, vol. 6, issue 1, pp. 13-28, (1989).

Mayya, K.S. et al., "Micro-encapsulation by complex coacervation: influence of surfactant", Polymer International, vol. 52, pp. 644-647, (2003).

* cited by examiner

SELF-HEALING ELASTOMER SYSTEM

FEDERALLY SPONSORED RESEARCH OR DEVELOPMENT

The subject matter of this application may have been funded in part under a research grant from the NASA Jet Propulsion Laboratory, under Contract Number JPL 1270900. The U.S. Government may have rights in this invention.

BACKGROUND

Cracks that form within materials can be difficult to detect and almost impossible to repair. A successful method of autonomically repairing cracks that has the potential for significantly increasing the longevity of materials has been described, for example, in U.S. Pat. No. 6,518,330. This self-healing system includes a material containing, for example, solid particles of Grubbs catalyst and capsules containing liquid dicyclopentadiene (DCPD) embedded in an epoxy matrix. When a crack propagates through the material, it ruptures the microcapsules and releases DCPD into the crack plane. The DCPD then mixes with the Grubbs catalyst, undergoes Ring Opening Metathesis Polymerization (ROMP), and cures to provide structural continuity where the crack had been.

Self-healing materials typically have been formed using engineering plastics, such as epoxy resins and epoxy-vinyl ester resins. Engineering plastics, in general, either fail at small deformations or are subject to permanent deformation, such as drawing, when strains become large. Cracks in engineering plastics can occur due to fatigue and/or brittle fracture.

Elastomers differ from engineering plastics in that elastomers can be subjected to large deformations and can then return to their original state with little or no permanent deformation. Applications of elastomers include seals, gaskets, coatings, adhesives, shock and/or vibration absorbers, electronics encapsulation, bladders, and vehicle tires. Crack formation in elastomers is referred to as tearing, and typically occurs at much higher strains than in engineering plastics.

Tearing in elastomers can be especially problematic. Since these materials typically are used to provide a region of flexibility to a system, they may be subjected to repeated stresses during use. Once a crack is initiated, it may grow quickly if the material is subjected to large and/or frequent stresses. If the crack is healed by the application of another polymer to the crack surface, the properties of the healed elastomer may be impaired if the mechanical properties of the new polymer and the original material are not closely matched.

It is desirable to provide an elastomer that can self-heal when subjected to a crack. It is also desirable to provide an elastomer that can maintain most or all of its advantageous elastomeric behavior after it has self-healed.

SUMMARY

In one aspect, the invention provides a composite material including an elastomer matrix, a plurality of first capsules including a polymerizer, and a plurality of second capsules including a corresponding activator for the polymerizer.

In another aspect, the invention provides a composite material including an elastomer matrix including a first polysiloxane, a plurality of first capsules including a polymerizer for a second polysiloxane, and a plurality of second capsules including a corresponding activator for the polymerizer.

In yet another aspect, the invention provides a method of making a composite material that includes combining ingredients, where the ingredients include a plurality of first capsules including a polymerizer, a plurality of second capsules including a corresponding activator for the polymerizer, and a matrix precursor. The method also includes solidifying the matrix precursor to form an elastomeric matrix.

The following definitions are included to provide a clear and consistent understanding of the specification and claims.

An elastomer matrix is a continuous phase in a material, where the continuous phase includes an elastomer.

An elastomer is a polymeric material that can be strained to at least 100% without failing. Strain of a material is the change in a linear dimension divided by the original value of the linear dimension. A material has undergone failure under stress when the material is permanently deformed and/or can no longer perform its intended function. Examples of failure in polymeric materials include breaking, necking and crazing.

A polymeric material is a material containing at least one polymer.

A polymer is a substance containing more than 100 repeat units. The term "polymer" includes soluble and/or fusible molecules having long chains of repeat units, and also includes insoluble and infusible networks.

A matrix precursor is a composition that will form an elastomer matrix when it is solidified. A matrix precursor may include a monomer and/or prepolymer that can polymerize to form an elastomer matrix. A matrix precursor may include an elastomer that is dissolved or dispersed in a solvent, and that can form an elastomer matrix when the solvent is removed. A matrix precursor may include an elastomer at a temperature above its melt temperature, and which can form an elastomer matrix when cooled to a temperature below its melt temperature.

A polymerizer is a composition that will form a polymer when it comes into contact with a corresponding activator for the polymerizer. Examples of polymerizers include monomers of polymers such as styrene, ethylene, acrylates, methacrylates and dicyclopentadiene (DCPD); a monomer of a multi-monomer polymer system such as diols, diamines and epoxide; prepolymers such as partially polymerized monomers still capable of further polymerization; and functionalized polymers capable of forming larger polymers or networks.

A prepolymer is a substance containing less than 100 repeat units and that can undergo further reaction to form a polymer.

An activator is anything that, when contacted or mixed with a polymerizer, will form a polymer. Examples of activators include catalysts and initiators. A corresponding activator for a polymerizer is an activator that, when contacted or mixed with that specific polymerizer, will form a polymer.

A catalyst is a compound or moiety that will cause a polymerizable composition to polymerize, and that is not always consumed each time it causes polymerization. This is in contrast to initiators. Examples of catalysts include silanol condensation catalysts such as titanates and dialkyltincarboxylates. Examples of catalysts also include ring opening polymerization (ROMP) catalysts such as Grubbs catalyst. A corresponding catalyst for a polymerizer is a catalyst that, when contacted or mixed with that specific polymerizer, will form a polymer.

An initiator is a compound or moiety that will cause a polymerizable composition to polymerize and, in contrast to a catalyst, is always consumed at the time it causes polymerization. Examples of initiators are peroxides (which will form a radical to cause polymerization of an unsaturated monomer); a monomer of a multi-monomer polymer system such as diols, diamines, and epoxide; and amines (which will form a polymer with an epoxide). A corresponding initiator for a polymerizer is an initiator that, when contacted or mixed with that specific polymerizer, will form a polymer.

A capsule is a closed object having an aspect ratio of from 1:1 to 1:10, and that may contain a solid, liquid, gas, or combinations thereof. The aspect ratio of an object is the ratio of the shortest axis to the longest axis, where these axes need not be perpendicular. A capsule may have any shape that falls within this aspect ratio, such as a sphere, a toroid, or an irregular ameboid shape. The surface of a capsule may have any texture, for example rough or smooth. Capsules may be hollow, or they may be solid particles.

An encapsulant is a material that will dissolve or swell in a polymerizer and, when combined with an activator, will protect the activator from reaction with materials used to form an elastomer matrix. A corresponding encapsulant for an elastomer matrix and for a polymerizer will protect an activator from reaction with materials used to form that specific elastomer matrix and will dissolve or swell in that specific polymerizer. An encapsulant may be formed into particles in the shape of a capsule.

An adhesion promoter is a substance that increases the adhesion between two substances, such as the adhesion between two polymers.

BRIEF DESCRIPTION OF THE DRAWINGS

The invention can be better understood with reference to the following drawings and description.

FIG. 1 is an illustration of a self-healing composite material, in which a crack has been initiated (FIG. 1A), in which the crack has progressed to release polymerizer and activator (FIG. 1B), and in which the crack has been healed by the formation of a polymer from the polymerizer and activator (FIG. 1C).

DETAILED DESCRIPTION

The present invention makes use of the discovery that an elastomer can be self-healing when it contains a polymerizer and an activator. A composite material containing an elastomer matrix, a polymerizer in capsules and a corresponding activator in capsules can be self-healing. When a crack forms in the composite material, a portion of the polymerizer flows into the crack. Some of the activator capsules may be broken by the crack, or the polymerizer may dissolve or swell some of the activator capsules, exposing the activator to the polymerizer in the crack. Contact between the polymerizer and the activator forms a polymer, repairing the crack.

The present invention includes a composite material containing an elastomer matrix, a first set of capsules containing a polymerizer, and a second set of capsules containing a corresponding activator for the polymerizer. The composite may be prepared by mixing the first and second set of capsules with a matrix precursor, and solidifying the elastomer precursor to form an elastomer matrix.

The elastomer matrix may include any elastomer into which the capsules may be dispersed. Elastomers may be insoluble, infusible networks, or they may be thermoplastic elastomers, which can be thermally re-processed. Elastomers may be polymers, copolymers, block copolymers, or polymer blends. See, for example, Geoffrey Holden, "Elastomers, Thermoplastic" *Encyclopedia of Polymer Science and Technology*, John Wiley & Sons, 2002.

Examples of elastomer polymers may include polyolefins, polysiloxanes, polychloroprene, and polysulfides. Examples of polyolefin elastomers include polyisoprene (including natural rubber), polyisobutylene, polybutadiene, poly(cyclooctadiene), and poly(norbornene). Examples of polysiloxane elastomers include poly(dimethyl siloxane), poly(methyl siloxane), partially alkylated poly(methyl siloxane), poly (alkyl methyl siloxane) and poly(phenyl methyl siloxane). Examples of polysulfide elastomers include crosslinked poly [bis(ethylene oxy)-2-disulfide] (Thiokol).

Examples of copolymer elastomers may include polyolefin copolymers and fluorocarbon elastomers. Examples of polyolefin copolymer elastomers include copolymers containing monomer units derived from ethylene, propylene, isoprene, isobutylene, butadiene and/or other dienes, and which may also contain monomer units derived from non-olefins, such as acrylates, alkylacrylates and acrylonitrile. Specific examples of polyolefin copolymer elastomers include ethylene-propylene-diene copolymer (EPDM), butadiene-acrylonitrile copolymer (nitrile rubber, NBR), isobutylene-isoprene copolymer (butyl rubber) and ethylene-acrylate copolymers. Examples of fluorocarbon elastomers include copolymers containing monomer units derived from hexafluoropropylene, vinylidene fluoride, tetrafluoroethylene and/or perfluoromethylvinylether.

Examples of block copolymer elastomers may include acrylonitrile block copolymers, polystyrene block copolymers, polyolefin block copolymers, polyester block copolymers, polyamide block copolymers, and polyurethane block copolymers. Examples of acrylonitrile block copolymer elastomers include styrene-acrylonitrile (SAN), and acrylonitrile-styrene-acrylate. Examples of polystyrene block copolymer elastomers include block copolymers of polystyrene, poly(α-methylstyrene) or other substituted polystyrenes with polyolefin elastomers, polyolefin copolymer elastomers, polysiloxanes or poly(alkylacrylates). A specific example includes styrene-butadiene copolymer (SBR). Examples of polyolefin block copolymer elastomers include block copolymers of polyethylene or isotactic polypropylene with poly(α-olefins) or polyolefin copolymer elastomers. Examples of polyester block copolymer elastomers include block copolymers of polyesters with polyethers. Examples of polyamide block copolymer elastomers include block copolymers of polyamides with polyesters or polyethers. Examples of polyurethane block copolymer elastomers include block copolymers of polyurethanes with polyethers or polyesters.

Examples of polymer blend elastomers include mixtures of polypropylene with polyolefin elastomers, polyolefin copolymer elastomers, polyolefin block copolymer elastomers, polypropylene copolymers or poly(ethylene-co-vinyl acetate). Examples of polymer blend elastomers include mixtures of butadiene-acrylonitrile copolymer elastomer (NBR) with polyamides or poly(vinyl chloride). Examples of polymer blend elastomers include mixtures of polysiloxane elastomers with polyesters or polyamides. Examples of polymer blend elastomers include mixtures of polyacrylates with polyolefins or with block copolymer elastomers containing blocks of polyurethanes, polyamides, or polyesters.

Examples of polymer blend elastomers include mixtures of polyesters with EPDM. Examples of polymer blend elastomers include mixtures of polystyrene or polypropylene with block copolymer elastomers containing polystyrene blocks. One or more of the polymers in a polymer blend may be crosslinked to provide an interpenetrating network.

The elastomer matrix may include more than one type of elastomer. In addition, the elastomer may be modified, for example by crosslinking, by chemical modification to introduce or to protect functional groups, by grafting of polymer chains, or by surface treatments. The elastomer matrix can include other ingredients in addition to the elastomer. For example, the matrix can contain stabilizers, antioxidants, flame retardants, plasticizers, colorants and dyes, odorants, particulate fillers, reinforcing fibers, and adhesion promoters.

The polymerizer contains a polymerizable substance such as a monomer, a prepolymer, or a functionalized polymer having two or more reactive groups. The polymerizer optionally may contain other ingredients, such as other monomers and/or prepolymers, stabilizers, solvents, viscosity modifiers such as polymers, inorganic fillers, odorants, colorants and dyes, blowing agents, antioxidants, and co-catalysts. A polymerizer also may contain one part of a two-part catalyst, with a corresponding initiator being the other part of the two-part catalyst. The polymerizer preferably is capable of flowing when a crack in the composite contacts a capsule containing the polymerizer. Preferably, the polymerizer is a liquid.

Examples of polymerizable substances include functionalized siloxanes, such as siloxane prepolymers and polysiloxanes having two or more reactive groups. Functionalized siloxanes include, for example, silanol-functional siloxanes, alkoxy-functional siloxanes and allyl- or vinyl-functional siloxanes. Examples of polymerizable substances also include epoxy-functionalized monomers, prepolymers or polymers. Examples of polymerizable monomers include cyclic olefins, preferably containing from 4 to 50 carbon atoms and optionally containing heteroatoms, such as DCPD, substituted DCPD, norbornene, substituted norbornene, cyclooctadiene, and substituted cyclooctadiene. Examples of polymerizable monomers also include olefins such as ethylene, propylene, α-olefins, isoprene, isobutylene, butadiene and other dienes. Examples of polymerizable monomers also include other unsaturated monomers such as 2-chloro-1,3-butadiene (chloroprene), styrenes, acrylates, alkylacrylates (including methacrylates and ethacrylates), acrylonitrile, hexafluoropropylene, vinylidene fluoride, tetrafluoroethylene and perfluoromethylvinylether. Examples of polymerizable monomers also include lactones such as caprolactone, and lactams, that when polymerized will form polyesters and nylons, respectively.

A polymerizer may contain a multi-part polymerizer, in which two or more different substances react together to form a polymer when contacted with an activator. Examples of polymers that can be formed from multi-part polymerizer systems include polyethers, polyesters, polycarbonates, polyanhydrides, polyamides, formaldehyde polymers (including phenol-formaldehyde, urea-formaldehyde and melamine-formaldehyde), and polyurethanes. For example, a polyurethane can be formed by the reaction of one compound containing two or more isocyanate functional groups (—N=C=O) with another compound containing two or more hydroxyl functional groups (—OH). Block copolymers can also be formed from multi-part polymerizer systems, in which two or more types of prepolymers each contain at least one functional group that can react to form chemical bonds between the prepolymers, such that the prepolymers are converted to blocks within the block copolymer.

Preferably the polymerizer is a polymerizer for an elastomer. Since the matrix contains an elastomer, it is preferable for the polymer formed in a crack in the composite to be an elastomer as well. Preferably the elastomer formed from the polymerizer contains monomer units having chemical structures similar to monomer units in the matrix elastomer. If the matrix elastomer includes a block copolymer, the elastomer formed from the polymerizer preferably contains at least one block having a chemical structure similar to at least one block in the matrix elastomer.

In one example, for a composite having an elastomer matrix containing styrene-butadiene block copolymer, the polymerizer may contain butadiene. More preferably, the elastomer formed from the polymerizer has a chemical structure that is similar to the chemical structure of the matrix elastomer. More preferably, the elastomer formed from the polymerizer has a chemical structure that is identical to the chemical structure of the matrix elastomer.

The polymerizer may be a polymerizer for an elastomer. For example, the polymerizer may include a monomer, a mixture of monomers, and/or a prepolymer that, when polymerized, forms an elastomer polymer or copolymer elastomer as described above. In another example, the polymerizer may be a multi-part polymerizer for a block copolymer elastomer.

One example of a polymerizer for an elastomer is a siloxane polymerizer, which may form a polysiloxane elastomer when contacted with a corresponding activator. A polysiloxane elastomer formed from a siloxane polymerizer may be a linear or branched polymer, it may be a crosslinked network, or it may be a part of a block copolymer containing segments of polysiloxane and another polymer. Examples of polysiloxane elastomers include poly(dimethyl siloxane), poly(methyl siloxane), partially alkylated poly(methyl siloxane), poly(alkyl methyl siloxane) and poly(phenyl methyl siloxane). Preferably, the siloxane polymerizer forms poly(dimethyl siloxane), referred to as "PDMS." A siloxane polymerizer for PDMS may include a monomer, such as the cyclic siloxane monomer octamethylcylo-tetrasiloxane. A siloxane polymerizer for PDMS may include a functionalized siloxane, such as a prepolymer or a polymer containing dimethyl siloxane repeating units and two or more reactive groups.

A siloxane polymerizer may contain a multi-part polymerizer, in which two or more different substances react together to form a polysiloxane elastomer when contacted with an activator. In one example of a multi-part polymerizer, at least one part of the polymerizer can be a polymer containing two or more functional groups. For example, a silanol-functional polysiloxane can react with an alkoxy-functional polysiloxane to form a polysiloxane elastomer network. In the reaction of hydroxyl terminated polydimethylsiloxane (HOPDMS) with polydiethylsiloxane polydiethoxysiloxne, an activator such as dibutyltin dilaurate provides for elimination of ethanol and formation of a polydimethylsiloxane elastomer network, as illustrated in the following reaction scheme:

The polymerizer is present in the composite in capsules. The capsules can keep the polymerizer isolated from the activator and from the environment in which the composite is made and/or used. Preferably, the polymerizer capsules have an average diameter of from 10 nanometers (nm) to 1 millimeter (mm), more preferably from 30 to 500 micrometers (μm), more preferably from 50 to 300 μm. Polymerizer capsules may have an aspect ratio of from 1:1 to 1:10, preferably from 1:1 to 1:5, more preferably from 1:1 to 1:3, more preferably from 1:1 to 1:2, more preferably from 1:1 to 1:1.5. Polymerizer capsules may be hollow, having a capsule wall enclosing an interior volume containing the polymerizer.

Hollow capsules having a capsule wall enclosing an interior volume may have wall thickness of from 100 nm to 3 μm. The selection of capsule wall thickness may depend on the elastomer matrix in the composite. For example, capsule walls that are too thick may not rupture when a crack approaches, while capsules with very thin walls may break during processing. Hollow capsules may be made by a variety of techniques, and from a variety of materials, such as those described in *Microencapsulation: Methods and Industrial Applications* Ed. Benita, Simon Marcel Dekker, New York, 1996; *Microencapsulation: Processes and Applications* Ed. Vandegaer, J. Plenum Press, New York, 1974; and *Microcapsule Processing and Technology* Kondo, A. Marcel Dekker, New York, 1979. Examples of materials from which the capsules may be made, and the techniques for making them include: polyurethane, formed by the reaction of isocyanates with a diol; urea-formaldehyde, formed by in situ polymerization; gelatin, formed by complex coacervation; polyurea, formed by the reaction of isocyanates with a diamine or a triamine, depending on the degree of crosslinking and brittleness desired; polystyrenes or polydivinylbenzenes formed by addition polymerization; and polyamide, formed by the use of a suitable acid chloride and a water soluble triamine.

The activator may be a corresponding activator for the specific polymerizer present in the composite. A wide variety of activators can be used, including activators that are low in cost and easy to process into capsules. Capsules that include the activator may also include other ingredients, such as stabilizers, solvents, viscosity modifiers such as polymers, inorganic fillers, odorants, colorants and dyes, blowing agents, antioxidants and co-catalysts. If the polymerizer is a multi-part polymerizer, then one of the polymerizable substances may be present in the capsules with the activator, as long as the polymerizable substance does not consume the activator.

Corresponding activators for the reaction of silanol-functional siloxanes with alkoxy-functional siloxanes include any catalyst that promotes silanol condensation or the reaction of silanol with alkoxy-functional siloxane groups. Examples of these catalysts include amines and include metal salts, where the metal can be lead, tin, zirconium, antimony, iron, cadmium, calcium, barium, manganese, bismuth or titanium. Specific examples of amines include amine compounds, such as n-hexylamine and cyclohexylamine; and amine salts, such as hexylamine hydrochloride, butylamine acetate and guanidine di-ethylhexoate. Metal salts include, for example, metal salts of carboxylic acids. Specific examples of metal salts include carboxylic acid salts of tin, such as dibutyltin dilaurate, dibutyltin diacetate, tin(II)octoate, tin(II)neodecanoate, tin(II)oleate, dibutyltin diisooctylmaleate, dibutyltin didodecanoate, di-n-butylbutoxychlorotin, dimethyltin dineodecanoate, dioctyltin dilaurate, dibutyldimethoxystannane, bis(acetoxydibutyltin)oxide, tetrakis(acetoxydibutyltinoxy)silane, 4,4,8,8-tetrabutyl-2,2,6,6-tetraethoxy-1,3,5,7-tetraoxa-2,6-di-sila4,8-distannocane, α-ethyl-ω-acetoxypoly(diethoxysiloxaneoxydibutyl stannanediyl), and di-n-butylbis(2-ethylhexanoate)tin. Specific examples of metal salts also include carboxylic acid salts of lead, such as lead laurate; carboxylic acid salts of cobalt, such as cobalt naphthenate; and carboxylic acid salts of titanium, such as tetrabutyl titanate, tetraoctyl titanate, tetraisopropyl titanate, titanium di-n-butoxide bis(2,4-pentanedionate), titanium diisopropoxide bis(2,4-pentanedionate), and titanium diisopropoxide bis(ethylacetoacetate).

Corresponding activators for epoxy polymers include any activator that can react with two or more epoxy functional groups. For example, an epoxy polymer can be formed by the reaction at or below room temperature (25° C.) of one compound containing two or more epoxy functional groups with another compound containing either at least one primary amine group or at least two secondary amine groups. In these systems, the amine compound can be present in a composite as the activator for an epoxy functionalized polymerizer.

Corresponding catalysts for polymerizable cyclic olefins are ring opening metathesis polymerization (ROMP) catalysts such as Schrock catalysts (Bazan, G. C.; Schrock, R. R.; Cho, H.-N.; Gibson, V. C. *Macromolecules* 24, 4495-4502 (1991)) and Grubbs catalysts (Grubbs, R. H.; Chang, S. *Tetrahedron* 54, 4413-4450 (1998)). Corresponding catalysts for lactones and lactams are cyclic ester polymerization catalysts and cyclic amide polymerization catalysts, such as scandium triflate.

Corresponding activators may be two-part activators, in which two distinct substances must be present in combination for the activator to function. Both parts of a two-part activator may be present in a mixture in the capsules, or the two parts may be separated into different capsules. The two parts of a two-part activator may also be separated between the capsules and the polymerizer.

In one example of a two-part activator system, one part of the activator may be a tungsten compound, such as an organoammonium tungstate, an organoarsonium tungstate, or an organophosphonium tungstate; or a molybdenum compound, such as organoammonium molybdate, an organoarsonium molybdate, or an organophosphonium molybdate. The second part of the activator may be an alkyl metal halide, such as an alkoxyalkyl metal halide, an aryloxyalkyl metal halide, or a metaloxyalkyl metal halide in which the metal is independently tin, lead, or aluminum; or an organic tin compound, such as a tetraalkyltin, a trialkyltin hydride, or a triaryltin hydride.

In another example of a two-part activator system, a polymerizer may contain isocyanate functional groups (—N═C═O) and hydroxyl functional groups (—OH). For example, the polymerizer may be a compound containing both an isocyanate group and a hydroxyl group. In another example, the polymerizer may contain two different compounds, one compound containing at least two isocyanate groups and the other compound containing at least two hydroxyl groups. The reaction between an isocyanate group and a hydroxyl group can form a urethane linkage (—NH—C(=O)—O—) between the compounds, possibly releasing carbon dioxide. This carbon dioxide can provide for the creation of expanded polyurethane foam; optionally the polymerizer may contain a blowing agent, for example a volatile liquid such as dichloromethane. In this condensation polymerization system, one of the two activator components may be mixed with the polymerizer, with the other activator component acting as the initiator. For example, one component could be an alkyltin compound such as stannous 2-ethylhexanoate, and the other component could be a tertiary amine such as diazabicyclo[2.2.2]octane (DABCO). These systems are described in Malcolm P. Stevens; *Polymer Chemistry: An Introduction*, 3rd Edition; New York: Oxford University Press, 1999, p. 378-381. A condensation polymerization system may be advantageous in healing an elastomer matrix with an elastomer such as a polyester block copolymer elastomer, a polyamide block copolymer elastomer, or a polyurethane block copolymer elastomer.

In another example of a two-part activator system, the polymerizer may contain unsaturated polymerizable monomers such as ethylene, propylene, α-olefins, isoprene, isobutylene, butadiene, other dienes, chloroprene, styrenes, acrylates, alkylacrylates, acrylonitrile, hexafluoropropylene, vinylidene fluoride, tetrafluoroethylene and perfluoromethylvinylether. In one example, atom transfer radical polymerization (ATRP) may be used, with one of the two activator components being mixed with the polymerizable compound and the other activator component acting as the initiator. One component can be an organohalide such as 1-chloro-1-phenylethane, and the other component can be a copper(I) source such as copper(I) bipyridyl complex. In another example, one activator component could be a peroxide such as benzoyl peroxide, and the other activator component could be a nitroxo precursor such as 2,2,6,6-tetramethylpiperidinyl-1-oxy (TEMPO). These systems are described in Malcolm P. Stevens; *Polymer Chemistry: An Introduction*, 3rd Edition; New York: Oxford University Press, 1999, p. 184-186.

These activator systems may be used to form polymers from polymerizable monomers and/or from prepolymers formed from the monomers. The presence of one or more prepolymers in the polymerizer or in the activator composition may facilitate the formation of block copolymers, either through the coupling of prepolymer chains or through the polymerization of monomer from a reactive site on the prepolymer chains. In one example, the activator includes a prepolymer formed from unsaturated monomers by ATRP, such that the prepolymer has at least one polymerizable group at a chain end. Contact of the activator with a polymerizable monomer can provide for polymerization of the monomer from this group, resulting in the growth of new polymer from the end of the prepolymer. If the polymerizable monomer is different from the monomer used to prepare the prepolymer, a block copolymer can be formed. Such a system may be advantageous in healing an elastomer matrix with an elastomer such as an acrylonitrile block copolymer elastomer, a polystyrene block copolymer elastomer, or a polyolefin block copolymer elastomer.

The activator is present in the composite in capsules. The capsules can keep the activator isolated from the polymerizer and from the environment in which the composite is made and/or used. Preferably, the activator capsules have an average diameter of from 10 nm to 1 mm, more preferably from 30 to 500 μm, more preferably from 50 to 300 μm. The activator capsules have an aspect ratio of from 1:1 to 1:10, preferably from 1:1 to 1:5, more preferably from 1:1 to 1:3, more preferably from 1:1 to 1:2, more preferably from 1:1 to 1:1.5. Activator capsules may be hollow, having a capsule wall enclosing an interior volume containing the activator. Hollow capsules having a capsule wall enclosing an interior volume may have wall thickness from 100 nm to 3 μm. The selection of capsule wall thickness may depend on the elastomer matrix in the composite, as noted above for polymerizer capsules.

Activator capsules may be particles containing a mixture of the activator and an encapsulant. These particles may be made by a variety of techniques, and from a variety of materials. For example, small particles or a powder of the activator may be dispersed into a liquid containing the encapsulant, followed by solidification of the mixture of encapsulant and activator. Particles of the protected activator in an encapsulant are preferably microparticles having an average diameter of at most 500 μm. The encapsulant is soluble or swellable in the polymerizer, and is a solid at room temperature. The polymerizer may dissolve the encapsulant, releasing the activator and forming a polymer. The polymerizer may swell the encapsulant so that the particle can be penetrated by the polymerizer sufficiently to allow polymerization of the polymerizer when it contacts the activator. Encapsulants and their use in capsules containing activators are described, for example, in U.S. Pat. No. 6,669,961.

The composite may include one or more adhesion promoters, which may be present in the elastomer matrix and/or in one or both sets of capsules. One type of adhesion promoter that may be present includes substances that promote adhesion between the elastomer matrix and the capsules. The adhesion between the matrix and the capsules may influence whether the capsules will rupture or debond in the presence of an approaching crack. To promote the adhesion between the matrix and the capsule wall, various silane coupling agents may be used. Typically, these are compounds of the formula R—SiX$_3$, where R is preferably a reactive group R$^1$ separated by a propylene group from silicon, and X is an alkoxy group (preferably methoxy), such as R$^1$—CH$_2$CH$_2$CH$_2$Si(OCH$_3$)$_3$. Examples include the following silane coupling agents available from DOW CORNING (Midland, Mich.), with the reactive group noted in parentheses: Z6020 (Diamino); Z6030 (Methacrylate); Z6032 (Styrylamine Cationic); Z6040 (Epoxy); and Z6075 (Vinyl). To increase the adhesion between the capsules and an elastomer matrix in the composite, the capsules may be treated by washing them in a solution of the coupling agent. For example, urea-formaldehyde capsules may be washed in a solution of Silane Z6020 or Z6040 and hexane (1:20 wt.) followed by adding Silane Z6032 to the elastomer matrix (1% wt.).

Another type of adhesion promoter that may be present includes substances that promote adhesion between the elastomer matrix and the polymer formed from the polymerizer when contacted with the activator. The adhesion between the matrix and this polymer may influence whether the composite can be healed once a crack has been introduced. To promote the adhesion between the elastomer matrix and the polymer formed in the crack, various unsaturated silane coupling agents may be used. Typically, these are compounds of the formula R$^2$—SiX'X"X'", where R$^2$ is preferably an unsaturated group R$^3$ separated by a propylene group from silicon; and X', X" and X'" are independently alkyl or alkoxy, such that at least one of X', X" and X'" is an alkoxy group (preferably ethoxy), such as R$^3$—CH$_2$CH$_2$CH$_2$Si(OCH$_2$CH$_3$)$_3$.

Examples include silane coupling agents available from GELEST, such as (3-acryloxpropyl)trimethoxysilane, (3-acryloxpropyl)methyldimethoxysilane, methacryloxypropyltrimethoxysilane, methacryloxypropylmethyldimethoxysilane, methacryloxypropyltriethoxysilane, methacryloxypropylmethyldiethoxysilane, 3-glycidoxypropyltrimethoxysilane, and N-2-aminoethyl-3-aminopropyltrimethoxysilane. To increase the adhesion between the elastomer matrix and the polymer formed in the crack, the adhesion promoter can be mixed with the matrix precursor before the final composite is formed.

A method of making a composite includes mixing ingredients including capsules containing a polymerizer, capsules containing a corresponding activator for the polymerizer, and a matrix precursor, and solidifying the matrix precursor. The method may further include forming capsules containing the polymerizer and/or forming capsules containing the corresponding activator. The matrix precursor may be any substance that can form an elastomer matrix when solidified.

In one example, the matrix precursor includes a monomer and/or prepolymer that can polymerize to form an elastomer. The polymerizer capsules and the activator capsules may be mixed with the monomer or prepolymer. The matrix precursor may then be solidified by polymerizing the monomer and/or prepolymer of the matrix precursor to form the elastomer matrix.

In another example, the matrix precursor includes a solution or dispersion of an elastomer in a solvent. The elastomer may be dissolved in a solvent to form the matrix precursor, and the capsules then mixed into the matrix precursor. The matrix precursor may be solidified by removing solvent from the composition to form the elastomer matrix.

In another example, the matrix precursor includes an elastomer that is at a temperature above its melting temperature. The elastomer may be melted to form the matrix precursor and then mixed with the capsules. The matrix precursor may be solidified by cooling the composition to a temperature below the melt temperature of the elastomer to form the elastomer matrix.

A combination of a plurality of first capsules containing a polymerizer and a plurality of second capsules containing a corresponding activator for the polymerizer may be useful as an additive to an elastomer. Preferably the addition of the first and second capsules to an elastomer provides self-healing properties to the elastomer. For example, a typical elastomeric gasket does not have self-healing properties; however, the addition of the first and second capsules to an elastomer may allow a gasket formed from the elastomer to be self-healing. The combination of first and second capsules thus provides a versatile way of improving the performance and service life of a wide variety of elastomers.

The combination of a plurality of first capsules containing a polymerizer and a plurality of second capsules containing a corresponding activator for the polymerizer may be provided as a kit for use in the preparation of elastomers. The first and second set of capsules may be in separate containers, or they may be in a single container. The kit may also contain one or more other substances, such as adhesion promoters, stabilizers, antioxidants, flame retardants, plasticizers, colorants and dyes, fragrances, particulate fillers, and reinforcing fibers. The kit may be used to provide self-healing properties to an elastomer.

A composite containing an elastomer matrix, a polymerizer, and an activator in capsules can be self-healing. When the composite is subjected to a crack, the activator and polymerizer can come into contact to form a polymer in the crack. It is desirable for the capsules containing the polymerizer and the capsules containing the corresponding activator to be dispersed throughout the composite, so that a crack will intersect one or more capsules of the polymerizer and of the activator. For hollow capsules, it is desirable for the crack to break the capsules. For particles containing an encapsulant, it is desirable for the capsules to be exposed to the polymerizer.

Figure 1A:
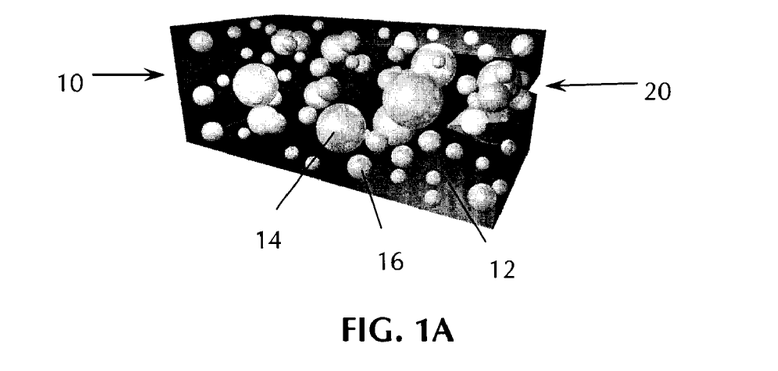
Figure 1B:
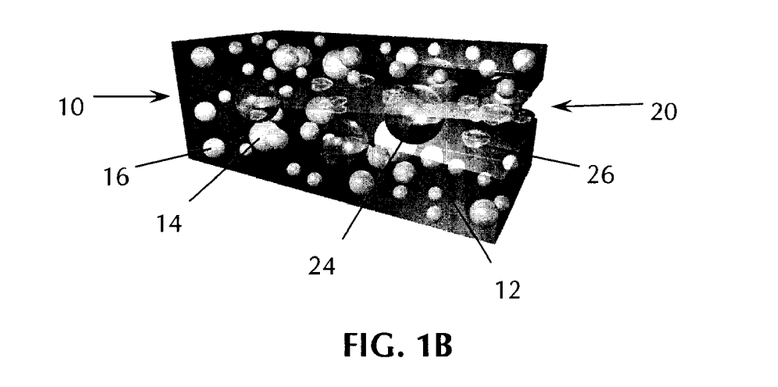
Figure 1C:
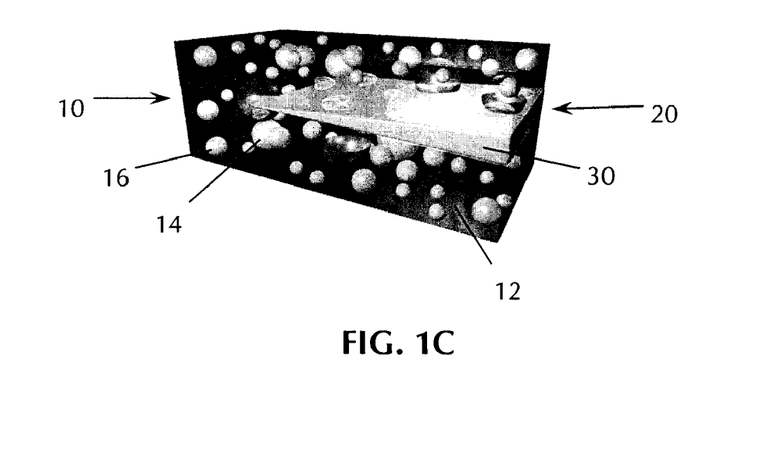

FIG. 1A illustrates a composite 10 having an elastomer matrix 12, capsules 14 containing a polymerizer, and capsules 16 containing an activator. A crack 20 has begun to form in the composite. FIG. 1B illustrates this composite when the crack has progressed far enough to intersect polymerizer capsules and activator capsules. Broken capsules 24 indicate that the polymerizer has flowed into the crack, and broken capsules 26 indicate that the activator has also been released into the crack. FIG. 1C illustrates the composite after the polymerizer and the activator have been in contact for a time sufficient to form a polymer 30 that fills the space from the crack.

The following examples are provided to illustrate one or more preferred embodiments of the invention. Numerous variations can be made to the following examples that lie within the scope of the invention.

EXAMPLES

Example 1

Formation of Capsules Containing Polymerizer

Urea-formaldehyde microcapsules containing a siloxane polymerizer were formed by mixing 200 mL of water and 5.0 g urea in a 600 mL beaker, followed by the addition of 0.5 g resorcinol and 0.5 g ammonium chloride. A 2.5 wt % solution of ethylene maleic anhydride copolymer (50 mL) was added to this mixture. The pH of the mixture was adjusted to 3.5 using 50 wt % NaOH and 1 N HCl aqueous solutions, and the mixture was then agitated at 550 rpm. A polymerizer mixture (60 mL) was added to the stirred solution, followed by 12.67 g of a 37% aqueous formaldehyde solution. The polymerizer mixture was formed from one of two components of the siloxane kit Sylgard® 184 (DOW CORNING), and contained a mixture of HOPDMS and polydiethoxysiloxane. The polymerizer component from the kit was combined with heptane to provide a polymerizer mixture containing 20% polymerizer.

The temperature of the reaction mixture was raised to 55° C. and held for 2 hours, after which 50 mL of water was added to the reaction mixture. After 4 hours, the reaction mixture was cooled to room temperature, and the microcapsules were separated. The microcapsule slurry was diluted with an additional 200 mL of water and washed with water (3×100 mL). The capsules were isolated by vacuum filtration, air dried and sieved to remove aggregated capsules.

Example 2

Formation of Capsules Containing Activator

Urea-formaldehyde microcapsules containing a tin catalyst were formed by mixing 200 mL of water and 5.0 g urea in a 600 mL beaker, followed by the addition of 0.5 g resorcinol and 0.5 g ammonium chloride. A 2.5 wt % solution of ethylene maleic anhydride copolymer (50 mL) was added to this mixture. The pH of the mixture was adjusted to 3.5 using 50 wt % NaOH and 1 N HCl aqueous solutions, and the mixture was then agitated at 550 rpm. The tin catalyst from the Sylgard® 184 kit was added to the stirred solution, followed by 12.67 g of a 37% aqueous formaldehyde solution. The temperature of the reaction mixture was raised to 55° C. and held for 2 hours, after which 50 mL of water was added to the reaction mixture. After 4 hours, the reaction mixture was cooled to room temperature, and the microcapsules were separated. The microcapsule slurry was diluted with an additional 200 mL of water and washed with water (3×100 mL). The capsules were isolated by vacuum filtration, air dried and sieved to remove aggregated capsules.

Example 3

Formation of Composite Material

Polysiloxane elastomers were formed from the siloxane kit Sylgard® 184. The polymerizer component and the catalyst component were combined according to the kit instructions in a 10:1 weight ratio (polymerizer component: catalyst component). A composite material was formed by mixing the siloxane kit components and allowing the components to cure for at least 4 hours. This pre-cure step prevented capsules from floating after being added to the mixture. The polymerizer capsules of Example 1 and/or the activator capsules of Example 2 were then mixed with the partially formed siloxane. This mixture was poured into an open metal mold and held for 48 hours at room temperature to provide the elastomeric composite. A control material was formed using the siloxane kit, but without adding any capsules. The relative amounts of polymerizer capsules and activator capsules used for each composite are listed in Table 1.

TABLE 1

Polysiloxane Elastomer Compositions

| Example | Polymerizer Capsules (wt %) | Activator Capsules (wt %) |
|---|---|---|
| 3A (control) | 0 | 0 |
| 3B | 0 | 5 |
| 3C | 5 | 5 |
| 3D | 10 | 5 |
| 3E | 15 | 5 |
| 3F | 20 | 5 |

Example 4

Testing of Composite Materials

The tear strengths of elastomer materials were measured using the trouser tear test. The test samples were rectangular, with a nominal thickness of from 1.5 to 2 mm. A center cut was made in each sample by hand using a fresh razor blade. Samples were tested within a few minutes of being cut. A test sample and the forces imposed on the sample in this test are illustrated schematically in the insert of FIG. 2. Each sample was gripped at the end of each "leg" formed by the center cut, and loaded in tension to failure, using a crosshead speed of 250 millimeters per minute. After a sample was subjected to the test, the torn sample was reassembled along the tear line and clamped between two glass slides for 48 hours at room temperature. The healed sample was then subjected to the trouser tear test again, and the results compared to those of the virgin material.

Figure 2:
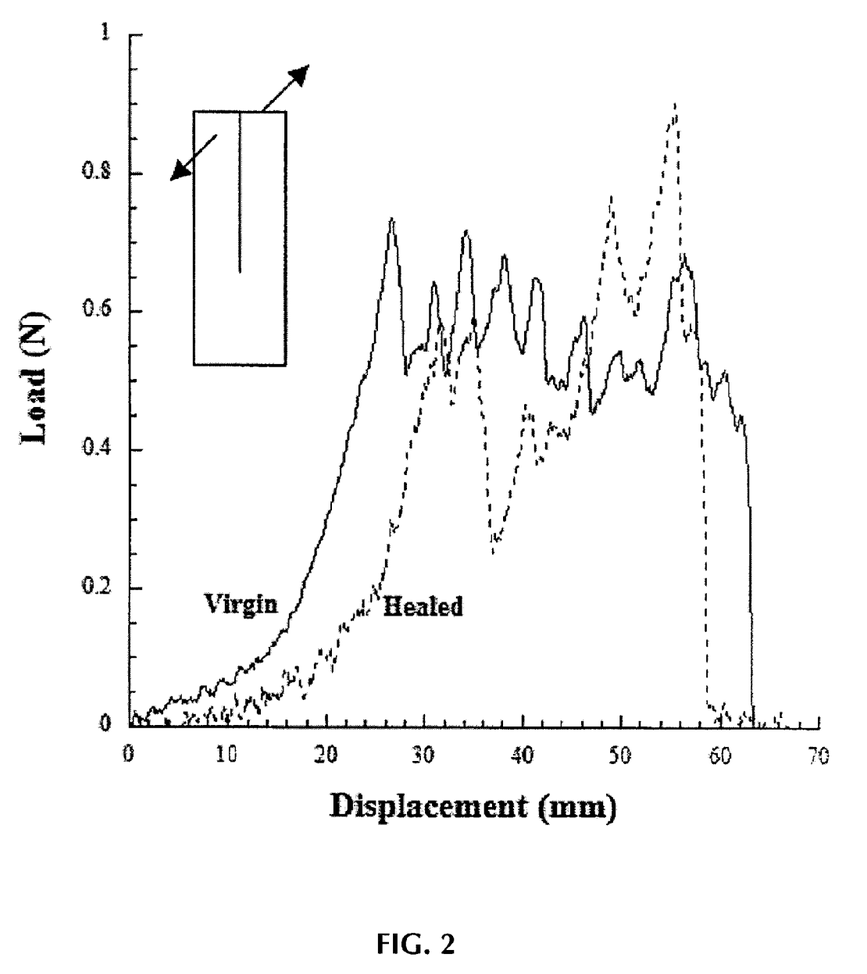
FIG. 2 is a set of graphs of load versus displacement for a self-healing composite material, and for the same material after self-healing.

The graphs of FIG. 2 show the load as a function of displacement for a sample of virgin composite material and for the same composite material after healing. Tear strengths were calculated by first averaging the load in the tearing region, which was the saw-tooth shaped region of the load-displacement plot. This average load ($F_{avg}$) and the sample thickness (t) were used to calculate the tear strength (T) using the following relationship:

$$T=(2\times F_{avg})/t$$

Figure 3:
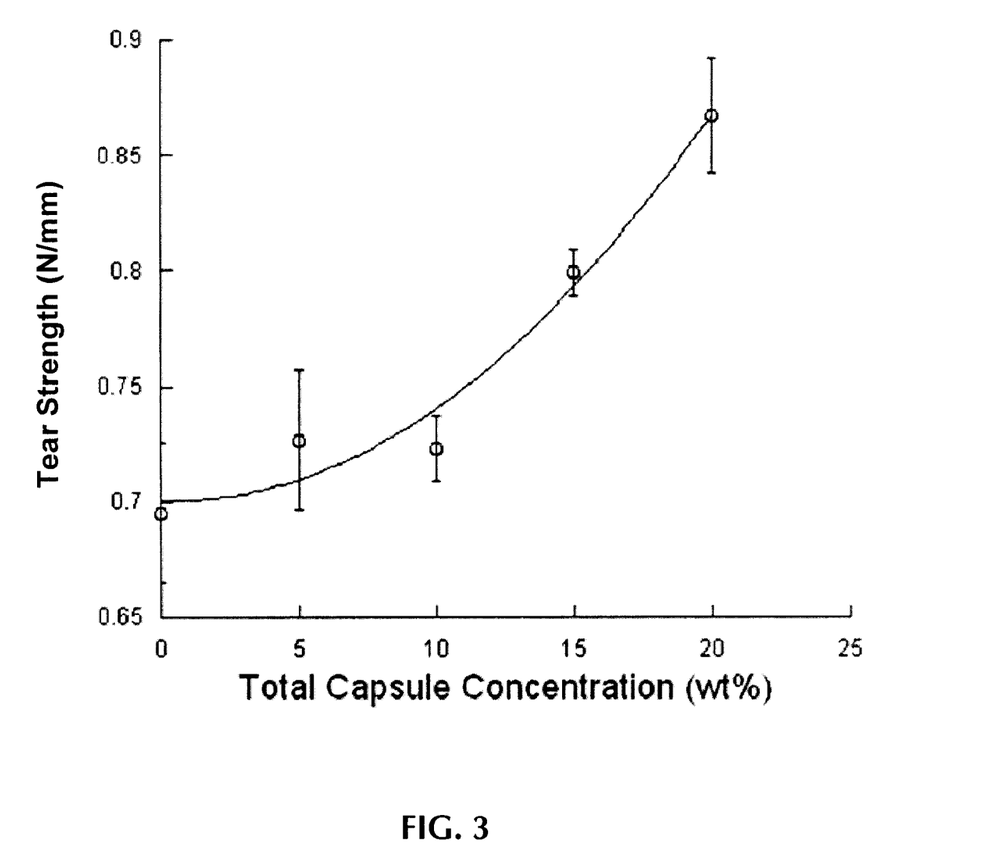
FIG. 3 is a graph of tear strength as a function of polymerizer capsule concentration for composite materials.

The presence of capsules increased the virgin tear strength by up to 170%. The graph of FIG. 3 shows the virgin tear strength as a function of polymerizer capsule concentration for Examples 3B to 3F.

Figure 4:
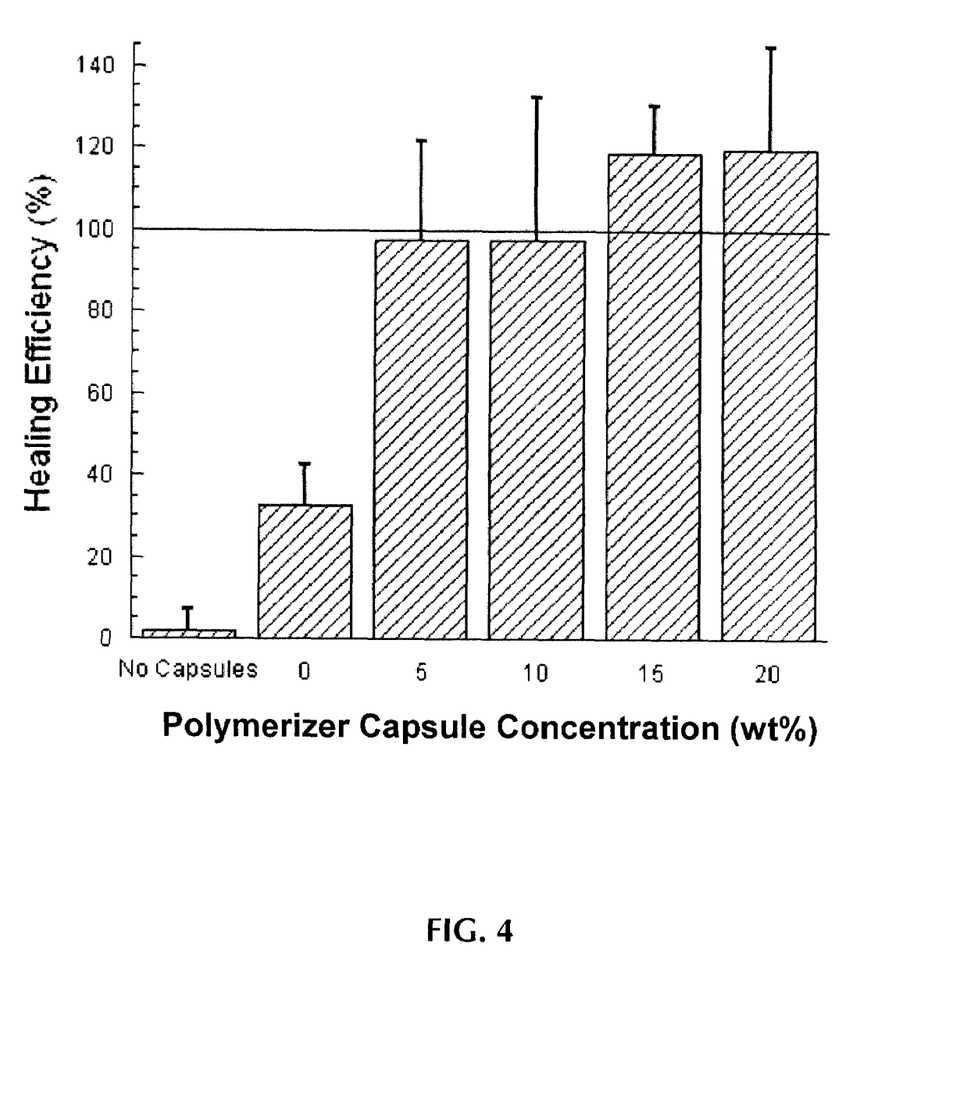
FIG. 4 is a graph of healing efficiency as a function polymerizer capsule concentration for a control elastomer and for composite elastomers.

The healing efficiency ($\eta$) was defined as the percentage recovery of the tear strength:

$$\eta=T_{healed}/T_{virgin}$$

where $T_{virgin}$ is the tear strength of the sample prior to the test, and $T_{healed}$ is the tear strength of the healed sample. For the results shown in FIG. 2, the healing efficiency was $\eta=70\%$. The graph of FIG. 4 shows the healing efficiency as a function polymerizer capsule concentration for Examples 3A to 3F. The entries on the horizontal axis from left to right correspond to Examples 3A to 3F. Each entry represents an average of 6 test specimens.

Increasing the polymerizer capsule concentration increased the average healing efficiency. Healing efficiencies greater than 100% typically occurred when the tear line in the healed sample deviated from the original tear line in the virgin material. The control sample, which contained no capsules, had a healing efficiency of only 2%, even though the tear line was not visible in some of the healed samples. One possible explanation for this low level of healing is that diffusional bonding and surface cohesion provided some bridging of polymer chains across the tear surface. The sample containing only activator capsules had a healing efficiency of about 30%. Possible explanations for this increased level of healing relative to the control sample include reaction of the activator with uncured resin in the matrix, and/or reaction of the activator with radicals formed by chain scission during sample failure.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A composite material, comprising:
a solid elastomer matrix comprising a first polysiloxane;
a plurality of first capsules comprising a polymerizer for a second polysiloxane; and
a plurality of second capsules comprising a corresponding activator for the polymerizer;
where the polymerizer comprises a mixture of hydroxyl terminated polydimethylsiloxane and polydiethoxysiloxane.

2. The composite material of claim 1, where the first polysiloxane comprises poly(dimethyl siloxane).

3. The composite material of claim 1, where the corresponding activator comprises a catalyst selected from the group consisting of amines and metal salts.

4. The composite material of claim 1, where the corresponding activator is a catalyst.

5. The composite material of claim 1, further comprising an adhesion promoter.

6. The composite material of claim 5, where the adhesion promoter is a silane coupling agent comprising at least one unsaturated group and at least one alkoxy group.

7. The composite material of claim 5, where the adhesion promoter is a silane coupling agent selected from the group consisting of (3-acryloxpropyl)trimethoxysilane, (3-acryloxpropyl)methyldimethoxysilane, methacryloxypropyltrimethoxysilane, 3-glycidoxypropyltrimethoxysilane, and N-2-aminoethyl-3-aminopropyltrimethoxysilane.

8. A composite material, comprising:

a solid elastomer matrix comprising a first polysiloxane;

a plurality of first capsules comprising a polymerizer for a second polysiloxane; and a plurality of second capsules comprising a corresponding activator for the polymerizer;

where the corresponding activator comprises a catalyst selected from the group consisting of amines and metal salts.

9. The composite material of claim 8, where the first polysiloxane comprises poly(dimethyl siloxane).

10. The composite material of claim 8, where the polymerizer is selected from the group consisting of a siloxane monomer and a functionalized siloxane.

11. The composite material of claim 8, where the polymerizer comprises a polymerizer for poly(dimethyl siloxane).

12. The composite material of claim 11, where the first polysiloxane comprises poly(dimethyl siloxane).

13. The composite material of claim 8, further comprising an adhesion promoter.

14. The composite material of claim 13, where the adhesion promoter is a silane coupling agent comprising at least one unsaturated group and at least one alkoxy group.

15. The composite material of claim 13, where the adhesion promoter is a silane coupling agent selected from the group consisting of (3-acryloxpropyl)trimethoxysilane, (3-acryloxpropyl)methyldimethoxysilane, methacryloxypropyltrimethoxysilane, 3-glycidoxypropyltrimethoxysilane, and N-2-aminoethyl-3-aminopropyltrimethoxysilane.

* * * * *